June 24, 1958 M. DI GIOVANNI 2,840,675
TRANSDUCER

Filed June 13, 1955 6 Sheets-Sheet 1

INVENTOR
MARIO DI GIOVANNI
BY
Philip Subkow
ATTORNEY.

June 24, 1958 M. DI GIOVANNI 2,840,675
TRANSDUCER
Filed June 13, 1955 6 Sheets-Sheet 2

INVENTOR
MARIO DI GIOVANNI
BY
ATTORNEY.

June 24, 1958  M. DI GIOVANNI  2,840,675
TRANSDUCER
Filed June 13, 1955  6 Sheets-Sheet 3

INVENTOR
MARIO DI GIOVANNI
BY
Philip Subkow
ATTORNEY.

June 24, 1958  M. DI GIOVANNI  2,840,675
TRANSDUCER

Filed June 13, 1955  6 Sheets-Sheet 4

INVENTOR
MARIO DI GIOVANNI
BY
Philip Subkow
ATTORNEY

June 24, 1958  M. DI GIOVANNI  2,840,675
TRANSDUCER

Filed June 13, 1955  6 Sheets-Sheet 6

INVENTOR
MARIO DI GIOVANNI
BY
ATTORNEY.

United States Patent Office 2,840,675
Patented June 24, 1958

2,840,675

TRANSDUCER

Mario Di Giovanni, Pacific Palisades, Calif., assignor to Statham Instruments, Inc., a corporation of California Application June 13, 1955, Serial No. 515,111

26 Claims. (Cl. 201—48)

This invention relates to a transducer or a motion sensing device, and more particularly concerns instruments for measuring forces, movements, fluid pressures, and the like. The invention is particularly directed to a transducer incorporating a wire resistance strain gauge of the so-called unbounded type for measurement of rectilinear motion.

Unbonded strain gauges are generally composed essentially of a strain sensitive wire connected to two supports which are subject to separation under an applied force. When subjected to tension the wire changes in dimensions, and therefore changes in resistance. Means are provided for measuring the resulting change in resistance which is then translatable into a measurement of the applied force. Such gauges have found a wide application in industry.

Usually, the movable members employed in such devices have supports or linkages to which the mountings for the strain wires are attached. Hence, the strain wire does not change in tension directly in response to movement of such movable members, which are generally in the form of diaphragms to which the force to be measured is applied, but rather in response to movement of such intermediary supports and linkages to which the wire mountings are connected. Hence, the change in tension of the strain wire in such instruments is brought about only indirectly in response to movement of the primary movable members or diaphragms. The use of the intermediate linkages and supports in the prior art devices renders such devices relatively complicated in structure, increases their weight and size, and tends toward inaccuracy of response.

Accordingly, one object of this invention is the elimination of the intermediate linkages and supports connected between the primary movable member of the transducer and the motion sensing means, e. g., strain wire associated therewith.

Another object is the attachment of the motion sensing means, e. g., the strain wire supporting pins and the strain wire connected thereto, directly to the primary movable member or diaphragm without the interposition of intermediate supports or linkages.

A still further object is the provision of a transducer capable of responding to a rectilinear motion, and employing the mechanical advantage obtained from a bell crank type of arrangement so as to increase the sensitivity and power output of the transducer or gauge.

A still further object is to provide a transducer or pressure gauge whose sensitivity to acceleration forces when employed in a moving vehicle, such as an airplane, is substantially reduced.

Still another object is the provision of a transducer of relatively small dimensions and having a minimum of structural elements, and which is readily assembled, is relatively inexpensive, yet which is reliable in operation.

I have now devised a transducer basically comprising a flexible beam supported intermediate its ends on a flexible support or flexure, and a motion sensing means associated with the outer end of the beam beyond said flexible support. The transducer, e. g., in the form of a pressure gauge, dynamometer or accelerometer, comprises a frame, and the flexible support or flexure member is connected to said flexible beam and to said frame at spaced points intermediate the ends of said beam and at an angle thereto, to provide spaced and localized points of bending in said flexure member intermediate the ends of said beam. Means, e. g., in the form of a pressure chamber or rod, is provided for applying a force to said beam to produce a deflection of said beam on said flexure member at points between the flexure member in a direction opposite to the direction of deflection of said beam at points beyond said flexure member. The motion sensing means includes an element connected directly to said beam near the outer end thereof, said element extending outwardly from said beam, preferably in a direction normal thereto.

A force, e. g., a pressure, applied to said beam either on the same or the other side of the flexure member or flexible support from its connection to said beam, i. e., applied to the outer end of said beam or adjacent the center of the beam, produces a flexure of said beam and said flexible support, in turn causing movement of the end of said beam beyond said flexible support in a direction opposite to the direction of movement of the central portion of said beam. The result is a pivotal motion of said element of the motion sensing means which is directly connected to the outer end of the beam, to produce a response of said motion sensing means corresponding to the motion of the beam and the magnitude of the force applied thereto.

Stated in a somewhat different manner, the invention comprises a flexible beam, a frame, a flexure having a plurality of spaced areas of bending connected at spaced points to the flexible beam intermediate its ends and to the frame, the beam having an area of bending between the spaced points of connection to the flexure, and extending in opposite directions beyond the flexure to provide two opposite cantilever ends. A force summing means is connected to the beam to deflect said beam, the beam between said points of connection deflecting in a direction opposite to the direction of deflection of the cantilever ends, and a motion sensing means, as noted above, is connected to said cantilever ends of the beam.

The flexure or flexible support for said beam may be two separate flexures unconnected except at the flexible beam and at the frame, or the flexure may be a single member, as in the case of a circular flexure described more fully hereinafter.

The flexible beam may be in a variety of shapes, which are intended to include not only a relatively narrow elongated member, but may be in the nature of a diaphragm of circular or elliptical shape, or of a shape having rounded corners and straight sides, or of any other suitable shape. The flexible support is connected to the flexible beam at two positions intermediate its ends, and if the support is in the nature of a pair of straight flexible walls parallel to each other, the connection between said flexible walls and the beam or diaphragm will be along two parallel lines in the plane of the beam so that flexure of the beam permitted by said flexible walls will be substantially in a longitudinal direction along the beam. On the other hand, if said flexible support or supports are arcuately shaped so that the connections between said supports and the beam or diaphragm are along arcs in the plane of said beam, said beam or diaphragm will deflect radially of said arcuate lines of connection on the application of a force against said diaphragm, and form a spherically shaped cap. In any event, the portions of said beam or diaphragm adjacent the periphery thereof and beyond the connections of said flexible supports with said beam will deflect from said connections in a direction opposite to deflection of the central portion of the diaphragm to form said cap.

As applied to a resistance wire strain gauge, the flexible beam, preferably in the form of a diaphragm, is mounted near its periphery on a flexible cylindrical support in a frame. On the application of uniformly distributed forces to the diaphragm, which forces are applied to the inner portion of the diaphragm within the points of support thereof, the diaphragm deflects from an approximately flat configuration into a shape approximating that of a spherical cap. To an outer extension of the diaphragm beyond the points of support thereof in the frame may be fixed a plurality of lugs or insulated pins extending normal to the plane of the diaphragm. An array of electrical strain sensitive wires is looped between the lugs or pins on one or both sides of the diaphragm. The wires are thus disposed in a plane or planes parallel to the plane of the diaphragm and spaced therefrom, and said wires are connected electrically into a Wheatstone bridge circuit.

Where the strain wires are disposed on both sides of the diaphragm, when the diaphragm deflects under the applied forces, the strain wires on one side of the diaphragm are tensed and the wires on the other side of the diaphragm are relaxed, causing their relative resistance to change, and resulting in a change in the electrical balance of the bridge circuit. It is thus seen that the basic measuring system is the diaphragm and insulated array of strain wires supported directly by the diaphragm through the intermediary of the supporting pins or lugs, and the basic motion is a rotation of the lugs or pins in response to deflection of the diaphragm. In this manner a bell crank or lever arrangement is provided including the diaphragm and tilting lugs or pins as the arms of the bell crank. Thus, a small force applied against the diaphragm is multiplied because of the mechanical advantage to give a relatively larger tension on the wires. The angular displacement of the pins or lugs can thus be used to advantage to produce any desired magnification of the wire strain by making the pins or lugs of a suitable length to bring the plane of the resistance wires closer to or farther from the plane of the diaphragm.

The above device presents the following advantages over a typical bonded strain gauge applied, as is customary, on both sides of the diaphragm: (1) the strain wire device or motion sensing means is capable of being completely isolated from the area acted upon by the forces, and when used as a pressure gauge, this structure adds to simplification of construction, enabling the device to be readily adaptable to use with corrosive fluids, eliminating the necessity for pressure seals at holes for electrical leads; (2) the device is self temperature compensating; and (3) the wire lops can be strung under any desired initial tension and may be located at any desired distance from the plane of the diaphragm, making possible a substantially greater measure of control over the physical characteristics of the instrument.

When employed as a pressure transducer, there is provided a diaphragm-ended cylindrical pressure chamber flexibly supporting at its end a diaphragm. The diaphragm extends beyond the periphery of the cylinder, and onto the outer edge of the diaphragm exteriorly of the pressure chamber are mounted insulated lugs or pins between which are strung loops of strain wire. An internal pressure within the chamber actuates the diaphragm, as described above, to produce an electrical output.

Employing the invention transducer as a dynamometer, the diaphragm and strain wire structure described above is supported at the upper end of a chamber having a flexible end wall, and is provided with an actuating rod connected at one end to the center of the diaphragm, and at its opposite end to a flexible actuating member. The rod extends through a chamber in the instrument along the central axis of the diaphragm. A force applied to the actuating member produces axial movement of the actuating rod. Such axial movement produces deflection of the diaphragm and an electrical output through change in tension of the strain wires.

The transducer hereof can also be employed as a differential pressure transducer by providing the device with two pressure chambers, each one communicating with the opposite side of the sensing diaphragm. By connecting the strain wires on opposite sides of the diaphragm to give automatic indication of the ratio of the pressures in the two pressure chambers, a means of comparing pressures from two separate sources is provided.

Instead of employing a strain wire and pin device for sensing the motion of the diaphragm, inductive or electromagnetic motion sensing means can be employed. In this case, an arm is connected to the outer periphery of the diaphragm, extending preferably normal thereto. Disposed opposite said arm and spaced therefrom are magnetic coils mounted in a core member. Pivotal motion of the arm as a result of the flexing of the diaphragm on application of a force or pressure thereagainst, causes one portion of the arm to approach one of said coils, and another portion of said arm to move away from said other coil. The relative increase or decrease in the air gaps between the arm and the respective coils, as a result of pivotal motion of said arm, changes the reluctance of the respective air gaps and the inductance of the coils, and such change can be measured by any suitable means.

My invention will be more readily understood from the description below taken in connection with the accompanying drawings, wherein.

Referring to Figs. 1 to 4 of the drawing, numeral 20 is a cylindrical case having positioned in the lower end thereof a base member 21 having a thick lower portion 22 containing a central threaded bore 23 adapted to receive a pressure fluid fitting. Integral with the base member 21 and extending axially upward therefrom is a cylindrical portion 24 having an outer diameter substantially less than the inner diameter of case 20 and an inner diameter somewhat less than the diameter of the bore 23. The interior 25 of cylinder 24 communicates with bore 23.

The upper end 26 of cylindrical portion 24 is relieved or reduced substantially in thickness to form a flexible support 26, and a flexible beam in the form of a diaphragm 27 is integrally connected to the reduced upper end 26 of cylinder 24, and is supported thereon. Diaphragm 27 has a pair of curved end portions 27' (see Fig. 4) and a pair of straight sides 27" parallel to each other and joining the curved ends. It is seen that diaphragm 27 is positioned with its central axis located along the axis of cylinder 24, the outer portion 28 of the diaphragm consisting of the curved end portions 27', extending for a distance beyond the reduced upper end 26 of cylinder 24. The curved end portions 27' of the diaphragm are considered to constitute cantilever ends of the beam or diaphragm 27, and, on the application of a pressure transmitted by a pressure fluid in chamber 25 against the underside of diaphragm 27, the latter is deflected upwardly at its center portion 29 from its points of flexure at the connection of the diaphragm with the relieved end 26 of the cylinder, while the outer end 28 of the diaphragm is deflected downward from such points of flexure. Since the connection between support 26 and diaphragm 27 is arcuate, i. e., the intersection of the flexible support and the diaphragm is in the form of an arc or circle, the center portion 29 of the diaphragm 27 within the flexible supporting wall 26 will be deflected upward along radial lines of flexure from the flexible support 26 when a pressure is applied through chamber 25, and the relieved or reduced support 26 will tend to flex to accommodate the movement of the diaphragm. Upward flexing of the center portion of the diaphragm produces a downward flexure of the outer portion 28 of the diaphragm from the connection thereof with flexible support 26.

Four support arms 33, 34, 35 and 36, each having a notch 37 in one face substantially at the center of the arm are vertically disposed about the outer periphery of the diaphragm with a peripheral portion of the diaphragm fitted into the notches 37 of said arms and connected thereto by suitable means, such as by welding or brazing, etc. One pair of arms 33 and 34 are connected to the diaphragm at the opposite end of one straight edge 27'' thereof, while the other pair of arms 35 and 36 are connected to the diaphragm at the ends of the opposite straight edge 27'' of the diaphragm. It is thus seen that arms 33 to 36 are distributed about the periphery of the diaphragm so that one pair of arms 33 and 34 are in one plane on one side of the diaphragm, with the other pair of arms 35 and 36 in another parallel plane on the opposite side of the diaphragm.

Figure 3:
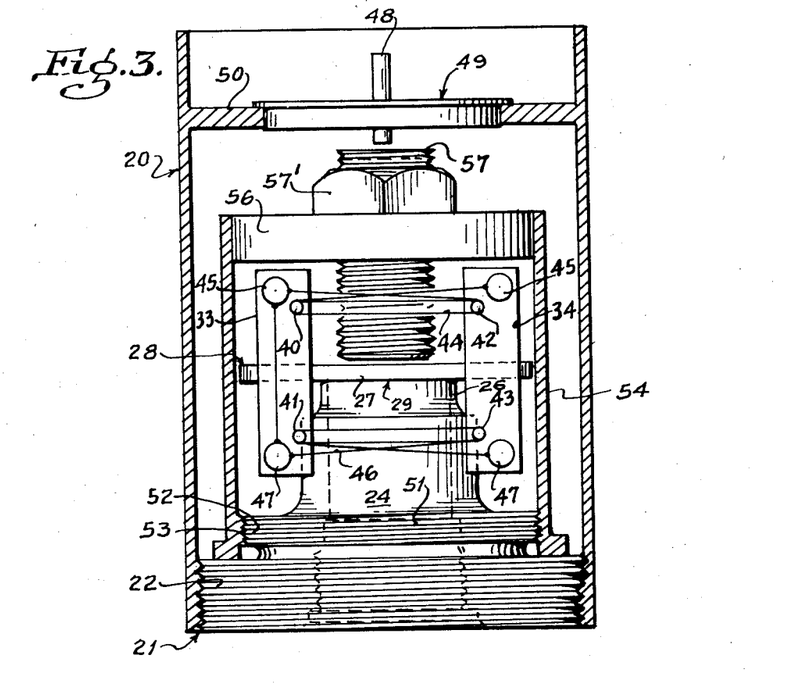
Fig. 3 is a section taken on line 3—3 of Fig. 1.
Figure 4:
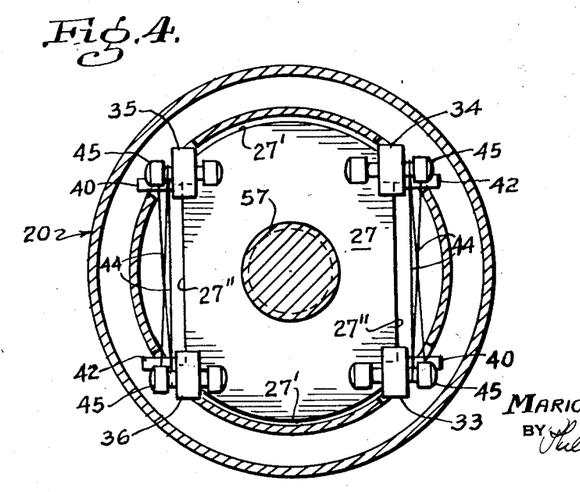
Fig. 4 is a horizontal section taken on line 4—4 of Fig. 1.

As seen in Fig. 3, arm 33 contains a pair of upper and lower insulated pins 40 and 41, and arm 34 has thereon a pair of similar upper and lower pins 42 and 43. Pins 40 and 42 are disposed horizontally opposite each other a substantial distance above diaphragm 27, and pins 41 and 43 are likewise disposed horizontally opposite each other approximately the same distance below the diaphragm. A strain wire 44 is looped in tension between pins 40 and 42, the ends of the wire being connected to terminals 45 located adjacent pins 40 and 42 on arms 33 and 34. A strain wire 46 is likewise looped in tension between pins 41 and 43, the ends of this wire being connected to terminals 47 adjacent pins 41 and 43 on arms 33 and 34. Support arms 35 and 36 on the opposite side of the diaphragm contain the same pins and terminals as arms 33 and 34, with a strain wire 44 looped across the upper pins above the diaphragm, and a wire 46 looped across the lower pins 41 and 43. The upper pair of wires 44 are substantially in a plane parallel to the diaphragm, as are the lower pair of strain wires 46. Electrical wires (not shown) connect the terminals 45 and 47 on the support arms 33 to 36 with the other terminals 48 in a Wheatstone bridge circuit arrangement, as is well known in the art, the wires 44 and 46 constituting the arms of the bridge. The terminals 48 are mounted on an insulated cover 49 positioned on a flange 50 integral with the upper end of case 20.

The base member 21 has a flange 51 extending outwardly therefrom intermediate the lower portion 22 and the cylindrical portion 24 of said base member, the periphery of the flange being threaded at 52 to receive an internal threaded portion 53 at the lower end of a cylindrical shield 54, the bottom 55 of which abuts the upper surface of base portion 22. A cover 56 fits into the upper end of the shield above arms 33 to 36, and an adjustable stop screw 57 having a nut 57' thereon resting on cover 56 is threaded axially through the cover, the bottom of the screw being positioned a short distance above the diaphragm to limit the extent of bending thereof. Shield 54 and cover 56 protect the diaphragm and its associated structure from the effects of external temperature variations. A slot 58 in cover 56 provides for the passage of the wires (not shown) connecting terminals 45 and 47 with the outer terminals 48.

When the diaphragm 27 is bent upward into the shape of a cap by the applied pressure in cylinder 24, the arms 33 to 36 are pivoted at their connection with the diaphragm, in a direction such that the upper ends of arms 33 and 34 (see Fig. 3) move outwardly away from each other, and the lower ends of said arms approach each other. Also, the upper ends of arms 35 and 36 are pivoted outwardly from each other, while the lower ends of these arms pivot inwardly toward each other. Hence, strain wires 44 above the diaphragm are placed in tension and strain wires 46 below the diaphragm are relaxed. This changes the relative resistances in the bridge circuit, resulting in an output which is proportional to such relative change and thus proportional to the amount of deflection of the diaphragm and to the pressure applied thereto.

It is seen that diaphragm 27 and each of the arms 33 to 36 form a bell crank lever arrangement so that the force against diaphragm 27 can be multiplied by placing the pins 40 and 42 at a greater distance from the diaphragm.

Also, it will be seen that if the instrument is subjected to linear acceleration in a direction normal to the plane of diaphragm 27, e. g., downward as viewed in Fig. 3, the outer portions 28 of the diaphragm beyond the supporting flexible end member 26, tend to bend upward to pivot arms 33 to 36 so as to bring the upper ends thereof closer together while tending to move the lower ends thereof away from each other. But this tendency toward upward bending of the end portions 28 of the diaphragm and the pivoting of arms 33 to 36 is substantially cancelled out by upward bending of the central portion 29 of the diaphragm, which tends to cause the outer end portions 28 of the diaphragm to bend downward against the tendency toward upward bending thereof due to acceleration. Hence, there is little or no resultant change in resistance of the strain wires due to acceleration, and thus essentially no error in output is introduced due to acceleration of the instrument. To obtain this desirable result the mass and stiffness of support arms 33 to 36 should be suitably chosen in relation to the mass of the diaphragm and its stiffness.

Referring now to Figs. 5 to 9, there is illustrated a transducer according to the invention and employed in the design of a differential pressure gauge. In the instant embodiment there is provided a cylindrical case 60, the upper end of which is received in a notch 61' of a heavy pressure cap 61, and the lower end of which is received in a notch 62' of a thick pressure member 62. A gasket 63' is disposed in each of notches 61' and 62' adjacent the ends of the case 60. Pressure cap 61 has a fluid pressure inlet 63, and pressure member 62 a fluid pressure inlet 64. A stepped pressure chamber 65 of cylindrical shape is axially positioned within case 60 adjacent the lower pressure member 62 and is connected thereto by means of bolts 66. Pressure chamber 65 has a thick lower portion 67, an intermediate portion 68 of decreased thickness, and a thin flexible upper portion 69 of cylindrical shape, and the bore 70 of chamber 65 communicates with the pressure fluid inlet 64.

Axially positioned within case 60 adjacent pressure cap 61 is a second pressure chamber 74 of substantially the same size and shape as pressure chamber 65, and connected to cap 61 by means of bolts 75. Pressure chamber 74 has a thick upper portion 76, an intermediate portion 77 of decreased thickness and a thin flexible lower portion 78, the bore 79 of chamber 74 communicating with the pressure fluid inlet 63. It is seen that the bores 70 and 79 of the pressure chambers 65 and 74 are of the same diameter and are in axial alignment, as are the respective wall sections of such chambers, including the adjacent thin cylindrical sections 69 and 78. However, the thick upper section 76 of pressure chamber 74 has a longitudinal groove 80 therein for a purpose pointed out hereinafter. It is noted that the bolts 66 and 75 connecting the end members 61 and 62 with the pressure chambers 65 and 74 also hold the ends of cylindrical case 60 in position in the notches 61' and 62' of such end members 61 and 62.

A diaphragm 85 substantially in the form of a square with its corners rounded off as at 86 and 86' (see Fig. 6) is integrally connected between the adjacent ends of the thin portions 69 and 78 of the pressure chambers 65 and 74. It is seen that the diaphragm 85 has an outer peripheral portion 87 extending beyond the thin wall sections 69 and 78 of the pressure chambers. Adjacent its peripheral edge the diaphragm is reinforced as shown at 88 to receive and hold in position a pair of oppositely disposed insulated pins 89 and 90 located near the two opposite rounded corners 86 of the diaphragm, and two pairs of oppositely disposed pins 91 and 92, and 93 and 94, said pairs of pins being positioned adjacent the two other oppositely disposed rounded corners 86' of the diaphragm. Pins 91 and 93 in one corner 86' of the diaphragm are located closely adjacent but spaced from each other, as are pins 92 and 94 in the opposite corner 86'. The pins pass through apertures in the diaphragm forming a press fit therewith, and said pins are positioned normal to the plane of the diaphragm, extending a substantially equal distance above and below the same.

Stretched in tension between the upper ends of pins 91, 89 and 92 is an electrical resistance strain wire 95, and stretched in tension between the upper ends of pins 93, 90 and 94 is a strain wire 96. A strain wire 97 is connected in tension between the lower ends of pins 91, 89 and 92, and a fourth strain wire 98 is connected between the lower ends of pins 93, 90 and 94. It is noted that strain wires 95 and 96 are located in a plane above the diaphragm 85 and parallel thereto, while strain wires 97 and 98 are disposed in a plane below diaphragm 85 and parallel thereto.

A cylindrical shield 102 formed in two longitudinally extending half sections 102' and 102", and having an annular top member 103 and bottom member 104 is disposed about the diaphragm 85 and its associated structure including the pins and strain wires. The outer periphery of the shield 102 is positioned closely adjacent the inner wall of case 60, and the vertical flanges 106 at the inner periphery of the annular top and bottom members 103 and 104 are connected by screws 106' to the outer surface of the end portions 67 and 76 of pressure chambers 65 and 74. The shield 102 protects the strain wire structure from the effects of external temperature variations.

It is seen that when pressure fluids having two different pressures are introduced through inlets 63 and 64 into pressure chambers 79 and 70, and applied against opposite faces of diaphragm 85, the diaphragm will bend or bulge outward at its center portion 105 into the pressure chamber, the fluid in which is under a lower pressure than the fluid in the opposite chamber, and the end portion 87 of the diaphragm will bend in the opposite direction about the thin flexure members 69 and 78. This will produce a pivotal motion of the pins such that the ends of the pins on the convex side of the deflected diaphragm will move away from each other, while the ends of the pins on the concave side of the deflected diaphragm will pivot toward each other. The result will be a tensioning of the strain wires on the convex side of the diaphragm and a relaxing of the wires on the concave side of the diaphragm.

The ends of the strain wires 95, 96, 97 and 98 are connected to terminals 109 (see Figs. 8 and 9) located in the wall of the intermediate section 77 of pressure chamber 74, to form a Wheatstone bridge circuit, as is well known in the art, the four strain wires forming the arms of said bridge. The six terminals 109 are furnished to provide additional connections into the bridge, e. g., an additional resistance for temperature compensation, as is well known. Terminals 109 are then connected in known fashion by wires (not shown) to terminals 110 positioned in the wall of section 76 of pressure chamber 74, forming the four connections of the bridge. Wires 111 connect terminals 110 with a plug 112, from which such wires are conducted externally within a cable 113. The plug 112 is received within a flanged sleeve 114 which is threaded at 115 into the pressure cap 61.

From the foregoing, it is seen that if the pressure fluid in the bore of chamber 65 is under a greater pressure than the fluid in the bore of upper chamber 74, the central portion 105 of diaphragm 85, between the points of flexure at walls 69 and 78 will bend upward into bore 79 of the upper chamber, and the outer portion 87 of the diaphragm beyond flexure members 69 and 78 will bend downward therefrom. The result of this bending of the diaphragm due to the differential pressure of the fluids in chambers 65 and 74 will be a pivotal movement of the pins from their fulcrum points at their connection with the diaphragm, so that the upper ends of the pins 89, 91 and 92, and of pins 90, 93 and 94 move away from each other, while the lower ends of these two sets of pins pivot toward each other. This produces a tensioning of strain wires 95 and 96 above the diaphragm, and a relaxation in strain wires 97 and 98 below the diaphragm. The change in tension in the wires produces a relative change in resistance therein and an output from the bridge circuit, which is proportional to the degree of the pivotal motion of the pins and hence of the bending of the diaphragm, and thus is proportional to the differential pressure applied against the diaphragm.

As in the case of the embodiment of Figs. 1 to 4, it is seen that a bell crank lever arrangement is formed by the diaphragm 85 and each of the pins connected thereto, the fulcrum of the bell crank being at the connection of the diaphragm with flexure members 69 and 78. Thus, the force applied in tensioning the strain wires can be multiplied by lengthening the pins so that the strain wires connected to the ends of the pins will be disposed at a greater distance from the diaphragm, thus lengthening one of the lever arms of the bell crank.

The addition of metal along the peripheral edge of diaphragm 85 to form a thick peripheral portion 88 functions, in addition to reinforcing the diaphragm, adds mass to the outer end of the diaphragm, to thus reduce the effect of acceleration on the instrument or render the instrument substantially insensitive to acceleration forces. Hence, the thickened portion 88 at the outer end of the diaphragm serves in the same manner as the arms 33 to 36 in the device of Figs. 1 to 4 to cancel out the tendency toward bending of the outer portion 87 of the diaphragm due to forces of acceleration.

If desired, it is seen that the device of Figs. 5 to 9 can be changed to a gauge for measuring the pressure of a single fluid by removing one of the pressure chambers, for example, pressure chamber 74. In this manner, the pressure of the fluid in chamber 65 causing a bending of the diaphragm, as pointed out above, can be measured directly in the manner described above.

Figure 10:
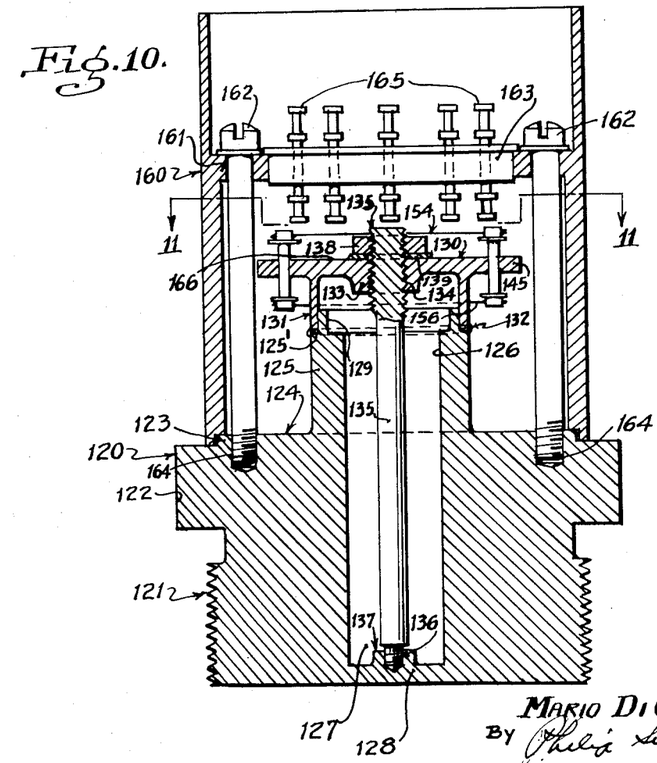
Fig. 10 is an elevation in section of another embodiment of the invention transducer taken on line 10—10 of Fig. 11.
Figure 11:
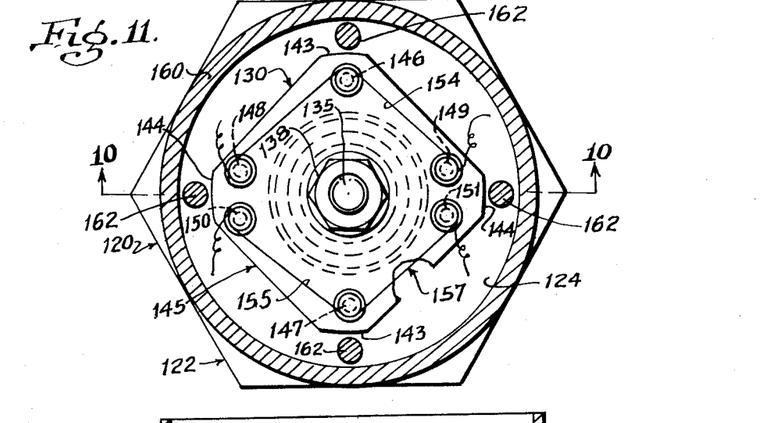
Fig. 11 is a section taken on line 11—11 of Fig. 10.

In Figs. 10 and 11 is illustrated another embodiment of the invention transducer. The instant embodiment may be employed for measuring a force, a pressure or an acceleration. The device comprises a cylindrical base member 120 which is externally threaded at 121 for attachment to a device for measuring a force associated therewith, or the linear acceleration of such device along the longitudinal axis of the transducer. The upper portion of base member 120 has a flange 122 forming a shoulder 123 with the upper surface 124 of such member. Integral with the upper portion of base member 120 and extending upwardly along the axis thereof is a hollow cylindrical portion 125 having a chamber or bore 126 therein which communicates and is axially aligned with an axial bore 127 formed in the body of base member 120, bores 126 and 127 having the same diameter. Bore 127 extends almost completely through the base member, the bottom of said bore forming a relatively thin diaphragm 128. A thin cylindrical lip 129 extends upwardly from the upper end of the cylindrical portion 125, said lip being disposed inwardly from the outer periphery of said cylindrical portion 125, to form a shoulder 125'.

A diaphragm 130 is axially mounted on a depending thin, flexible cylindrical support 131 integral with said diaphragm and disposed inwardly some distance from the outer periphery of diaphragm 130. Support 131 is of an internal diameter slightly greater than the outer diameter of lip 129, and the lower end of support 131 is positioned about lip 129 in abutting relation thereto to prevent lateral movement of said support and diaphragm 130, and said lower end of support 131 is connected to shoulder 125', e. g., by brazing at 132. Diaphragm 130 has a central hub 133 which is threaded at 134 to receive a rod 135 which extends axially into bores 126 and 127 and has a reduced threaded lower end 136 which is received in a central internally threaded hub 137 in the upper surface of diaphragm 128. A lock nut 138 and washer 139 are received over the upper end of rod 135 to prevent rotation of the rod and axial movement thereof with respect to diaphragm 130.

Diaphragm 130 is in the form of a square with its corners rounded off as at 143 and 144, similar to diaphragm 85 of the embodiment of Figs. 5 to 9. Connected to the outer portion 145 of diaphragm 130 beyond the cylindrical support member 131 is a pair of oppositely disposed insulated pins 146 and 147, each located near one of the two opposite rounded corners 143 of the diaphragm. Also, two pairs of oppositely disposed pins 148 and 149, and 150 and 151 are connected to the outer portion 145 of diaphragm 130, adjacent the two other oppositely disposed rounded corners 144 of the diaphragm. Pins 148 and 150 in one corner 144 of diaphragm 130 are located closely adjacent but spaced from each other, as are pins 149 and 151 in the opposite corner 144. The pins pass through apertures in diaphragm 130 and are held by a press fit therein, the pins being disposed normal to the plane of the diaphragm and extending above and below said diaphragm.

An electrical resistance strain wire 154 is stretched in tension between the upper ends of pins 148, 146 and 149, and a strain wire 155 is stretched in tension between the upper ends of pins 150, 147 and 151. Also connected in tension between the lower ends of pins 148, 146 and 149 is a third strain wire 156, with a fourth strain wire 157 stretched across the lower ends of pins 150, 147 and 151. It is seen that strain wires 154 and 155 are positioned in a plane above diaphragm 130 and parallel thereto, with strain wires 156 and 157 located in a plane below diaphragm 130 and parallel thereto.

A cylindrical case 160 is mounted at its lower end on shoulder 123 on the upper outer end of base member 120 and abutting the inner periphery of the flange 122 thereof. Integral with the inner wall of case 160, and positioned in the upper portion thereof above diaphragm 130 and its strain wire structure, is an internal flange 161. Four bolts 162 pass through flange 161, said bolts extending parallel to the axis of the instrument with their lower ends threaded into tapped holes 164 in the upper surface of the base member 120, to affix the case 160 to the base member. A cover 163 is positioned on flange 161, and on cover member 163 is supported a series of terminals 165 for a purpose noted hereinafter. Case 160 surrounds and protects the diaphragm 130 and its associated pins and strain wire structure from the effects of external temperature variations.

It is seen that when an upward force or pressure is applied against the diaphragm 128, rod 135 will be forced upward, causing diaphragm 130 to bend or deflect upward at its center portion 166 between the points of flexure of the diaphragm at its connection with the cylindrical support 131, and the outer portion 145 of the diaphragm 130 beyond the flexure member 131 will deflect downward therefrom. This produces a pivotal motion of the pins 146 to 151 such that the upper ends of the pins 146, 148 and 149, and of pins 147, 150 and 151 are displaced away from each other, while the lower ends of these two sets of pins pivot toward each other. The result is a tensioning of strain wires 154 and 155 above diaphragm 130, and a relaxation of the wires 156 and 157 below the diaphragm. The change in tension of the wires causes a proportional change in resistance therein. The ends of wires 154 to 157 are connected to terminals 165 to form a conventional bridge circuit, each of wires 154 to 157 forming an arm of the bridge circuit, and said change in resistance of the strain wires produces an output from such circuit which is proportional to the degree of pivotal motion of the pins 146 to 151 and hence to the bending of diaphragms 130 and 137, and thus is proportional to the force applied against the latter diaphragm.

If a downward force is applied against diaphragm 128, rod 135 will transmit said force to diaphragm 130, causing it to deflect or bend downward at its center portion 166 between the cylindrical support 131, with the outer portion 145 of diaphragm 130 deflecting upwardly. This produces pivotal motion of the pins 146 to 151 in a direction opposite to that described in the above paragraph, resulting in a tensioning of strain wires 156 and 157 below diaphragm 130 and a relaxation of strain wires 154 and 155 above said diaphragm. The consequent change in resistance of the strain wires produces an output from the bridge circuit proportional to the degree of bending of diaphragm 130 and to the force transmitted thereto by rod 135, as described above.

If desired, the embodiment of Figs. 10 and 11 can be modified to employ the device as a linear accelerometer. This can be accomplished by eliminating diaphragm 137 and connecting the lower end of rod 135 to a weight or mass suspended on the rod. Linear acceleration of the device, e. g., in a downward direction, as viewed in Fig. 10, will produce an upward acceleration force against rod 135, causing the rod to actuate diaphragm 130 to bend it and produce an output from the bridge circuit as a result of consequent change in resistance of the strain wires.

Figure 1:
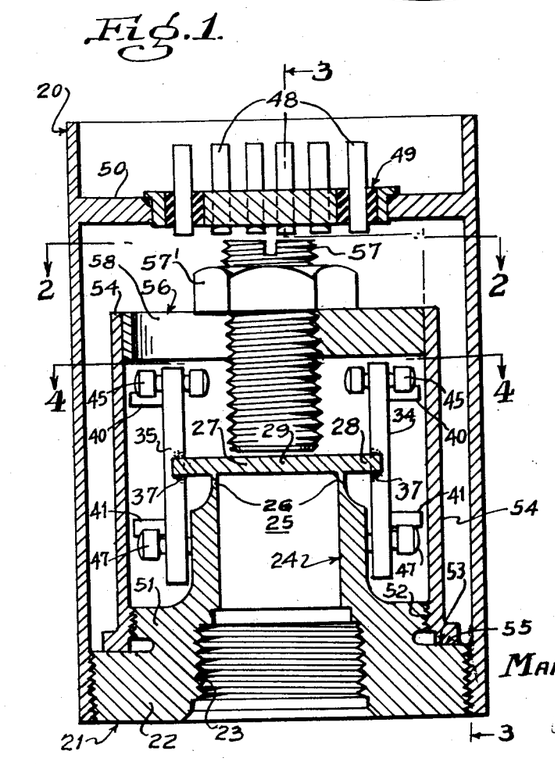
Fig. 1 is an elevational section of one embodiment of the invention transducer employed as a pressure gauge.
Figure 2:
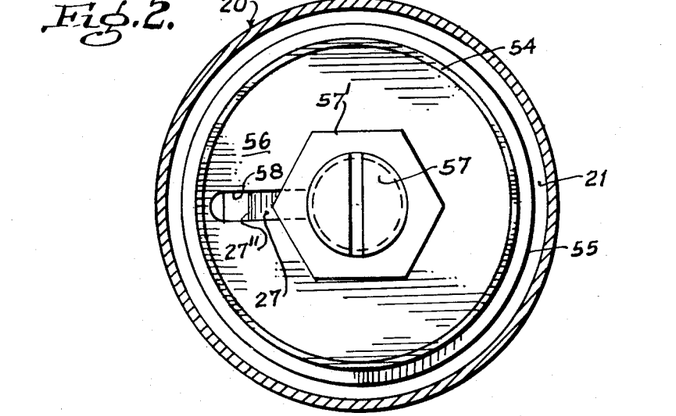
Fig. 2 is a section taken on line 2—2 of Fig. 1.

In the embodiments of the invention illustrated, the flexible support for the flexible beam or diaphragm, e. g., the thin upper end 26 of pressure chamber 24 in Fig. 1, has an arcuate or cylindrical cross section and is disposed substantially normal to the plane of the diaphragm.

Figure 6:
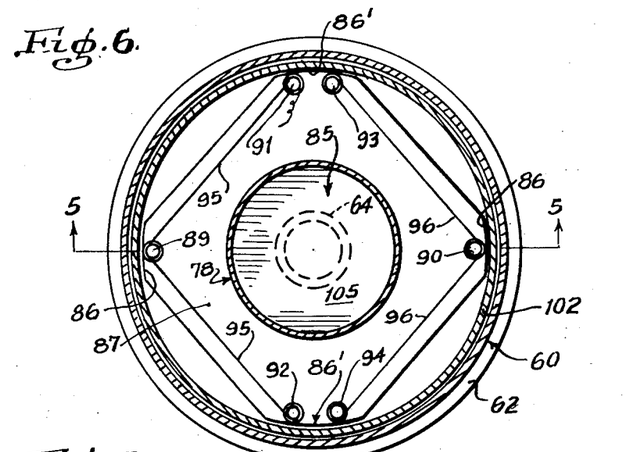
Fig. 6 is a horizontal section taken on line 6—6 of Fig. 5.
Figure 7:
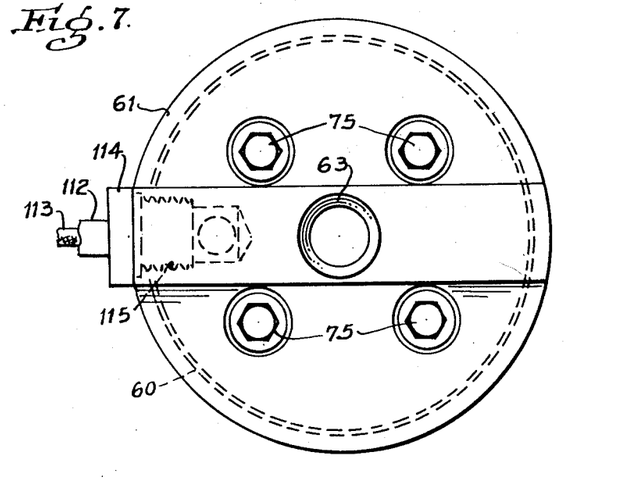
Fig. 7 is a plan view of the device of Fig. 5.
Figures 8, 9:
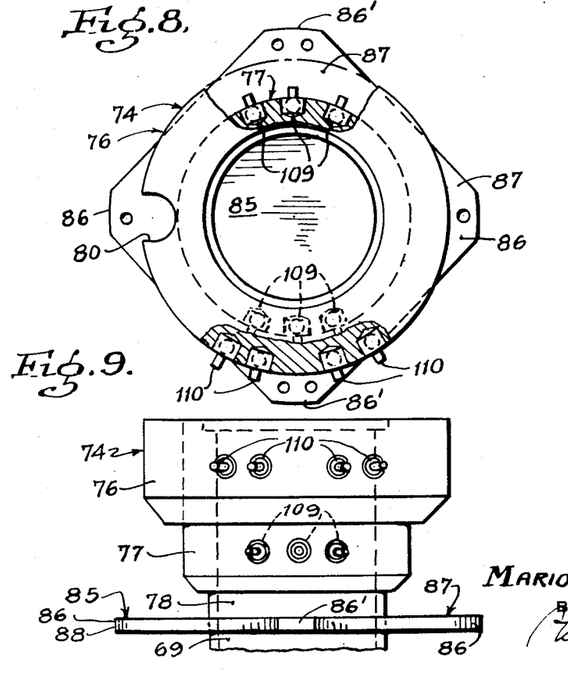
Fig. 8 is a plan view of the device of Fig. 5 with the top member and certain other parts removed, and shown partly in section for clarity.
Fig. 9 is a side elevation of a portion of the device of Fig. 5.
Figure 12:
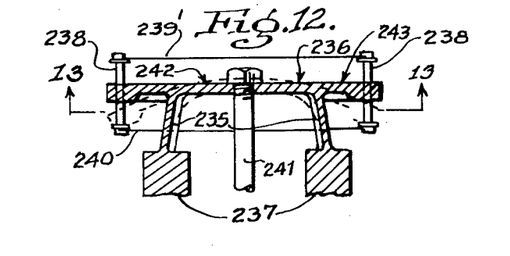
Fig. 12 is a schematic illustration of another embodiment of the invention.
Figure 13:
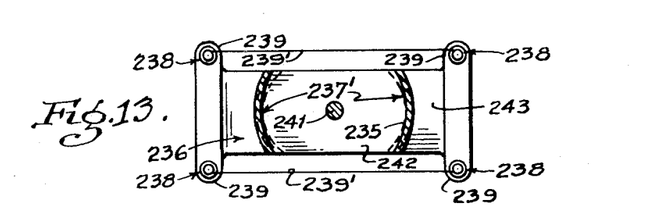
Fig. 13 is a view taken on line 13—13 of Fig. 12.

Also, as seen in Figs. 12 and 13, the flexible supports 235 supporting the flexible beam or diaphragm 236 can be disposed at an acute angle thereto, such flexible supports being in turn mounted on rigid supports 237. Supports 235 have an arcuate cross section, as seen in Fig. 13, and intersect beam 236 along arcs shown at 237'. In this form the beam or diaphragm 236, instead of being squared one side the flexures 235, as in the form of Figs. 6 and 8, is oblong, and the circular flexure, e. g. as in Figs. 6 and 8, is interrupted so as to form two opposite arcuate flexures 235 extending between the outside edges of the oblong beam 236. Pins 238 are mounted in outer end members 239 of the diaphragm, and strain wires 239' and 240 are connected across the upper and lower ends respectively of the pins. A force transmitting rod 241 is threaded into the center of beam 236. When the beam 236 is subjected to an upward force transmitted by rod 241 so as to deflect the beam to the dotted line position, shown in Fig. 12, the flexible supports 235 will bend, and flexure of beam 236 takes place along radial lines of flexure extending from the arcs 237', causing the central portion 242 of the beam between supports 235 to deflect upwardly into the shape of a cap, with the outer ends 243 of the beam beyond said supports deflected downwardly. The resistance of strain wires 239' and 240 will change, due to change in tension therein as result of the deflection of the beam 236 in proportion to the force transmitted by rod 241, as previously described.

If a downward force is transmitted by rod 224 or 241 to the associated beam 221 or 236, the center of the respective beams between the flexible supports 220 or 235 will be deflected downward with the outer ends 230 or 243 of said beams flexing upwardly. This will increase the tension in the lower strain wires 228 or 240, while relaxing the upper strain wires 227 or 239', thus changing the resistance of these wires and the output in proportion to the downward force transmitted by said rods to said beams.

Figure 5:
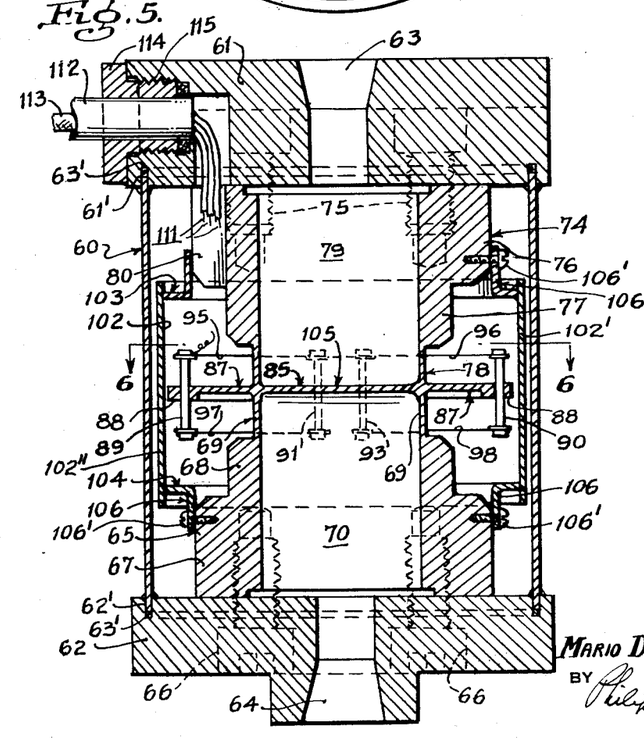
Fig. 5 is a section in elevation of my transducer in the form of a differential pressure gauge, taken on line 5—5 of Fig. 6.

As indicated in Figs. 12 and 13, it is seen that if desired, the flexible supports 26, 69, 78, 131 of Figs. 1, 5, 10 can be disposed at an angle to their respective diaphragms instead of being positioned substantially normal thereto.

Further, if desired, the flexible beam or diaphragm, instead of being in planar form, can be initially curved. Thus, when the diaphragm is subjected to a force or pressure, said diaphragm will be bent into an arc of greater or smaller radius than that in its initial position, with the transducer or motion sensing means being actuated as a result of such bending of the diaphragm.

From the foregoing, it is seen that I have designed a transducer of simplified structure wherein the motion sensing means is more directly associated with the movable diaphragm than in the prior art devices, eliminating linkages heretofore employed between the diaphragm and motion sensing means. Where a strain wire gauge is used as the motion sensing means, the pins for mounting the strain wires can be connected directly to the flexible beam or diaphragm, and my device thus embodies a bell crank lever mechanism providing a mechanical advantage from the force applied to the beam to the force applied in tensioning the strain wires, permitting increased sensitivity of the instrument for response to a rectilinear force or motion. Further, the device of the invention incorporates means to minimize or substantially eliminate response of the instrument to forces of acceleration to which the instrument may be subjected in use, thus reducing errors in the physical characteristics being measured, such as force or pressure, and rendering the instrument substantially non-responsive to such acceleration forces. My device is moreover easily assembled, is durable and reliable in operation.

In the embodiments of the invention shown and described above, it is noted that the pressure or force is applied to the portion of the diaphragm intermediate its points of location of connection with the flexible support or flexure member. Thus, for example, in the embodiment of Fig. 1, pressure is applied to the central areas 29 of diaphragm 27 within the flexible support or flexure member 26. Likewise, in the modification of Fig. 12, force is transmitted by rod 221 to the center areas 242 of diaphragm 236 between the points or location of connection of flexure member 235 with said diaphragm. Thus, for example, when pressure is applied through pressure chamber 24 against diaphragm 27, the central portion 29 of the diaphragm will be bent upward presenting a concave lower surface to the upper end of the pressure chamber, with the fibers in said lower surface in compression and the fibers in the upper convex surface of the diaphragm placed in tension. The outer ends 28 of the diaphragm are thus bent downwardly from flexure 26. If a vacuum is applied in pressure chamber 24 rather than a positive pressure, the central portion 29 of diaphragm 27 will be deflected downwardly on flexure member 26, while the outer ends of the diaphragm will be bent upwardly from flexure 26.

However, if desired, the force or pressure can be applied to the outer end of the flexible beam or diaphragm of my device beyond the connection of said beam or diaphragm with said flexure member. For example, in Fig. 12, rod 241 can be connected to the outer end 243 of diaphragm 236 instead of to the central portion 242 thereof. In the latter case, movement of the rod upwardly as viewed in Fig. 12, in response to an applied force will cause the outer portion of the beam to deflect upwardly from its connection with flexure 235, and the central portion 242 to deflect downwardly in the opposite direction.

The relative stiffness of the flexible support or flexure member of my device and the stiffness of the strain wires employed can vary. Thus, said flexure can be stiffer or less stiff than said wires, depending on whether the system is of the high energy or low energy type. A high energy system requires a large force for a given displacement of the motion sensing means, while a low energy system requires a relatively small force for the same displacement. In a high energy system the stiffness of the diaphragm or flexible beam is also stiffer than the strain wires. In practice, the thickness of the flexure is made about one-third the thickness of the diaphragm. However, this is essentially a matter of machining practicability, and this thickness ratio can be made to vary as desired.

For a given rigidity of diaphragm or flexible beam, the weaker the flexure member the greater the deflection at the ends of the diaphragm beyond said flexure member, on the application of a force to the center or outer ends of the diaphragm. Hence, in a low energy system employing a weak flexure member the ends of the diaphragm to which the motion sensing means, e. g., the pins and strain wires are connected, will deflect substantially more on application of the same force than in a high energy system, wherein the flexure member has a greater stiffness.

While I have described a particular embodiment of my invention for the purpose of illustration, it should be understood that various modifications and adaptations thereof may be made within the spirit of the invention as set forth in the appended claims.

I claim:

1. A motion sensing device which comprises a frame, a flexible diaphragm, a flexure member connected to said frame and to said diaphragm at an angle intermediate the ends thereof, said diaphragm extending beyond said flexure member, said flexure member having an arcuate cross section and intersecting said diaphragm along spaced arcs intermediate the ends of said diaphragm, said diaphragm bending along lines of flexure radially of said arcs on application of a force against said diaphragm, means for applying a force to said diaphragm, an unbounded electrical resistance strain wire mechanically connected to said diaphragm, and an electrical connection at the ends of said strain wire.

2. A transducer which comprises a diaphragm, means for flexibly supporting said diaphragm, said means including at least one member having an arcuately shaped cross section connected at an angle to said diaphragm at opposite spaced positions intermediate the ends of said diaphragm and intersecting said diaphragm along an arc, said diaphragm extending beyond said flexible supporting means on each side of said spaced positions and bending along lines of flexure radially of said arc on application of a force against said diaphragm, means for applying a force to said diaphragm between said flexible support means, said diaphragm deflecting upon said arcuately shaped member at points between said flexible support means in a direction opposite to the direction of deflection of said diaphragm at the outer ends thereof beyond said flexible support means, spaced apart members mounted on the periphery of said diaphragm and extending substantially normal to the plane of said diaphragm, an unbonded electrical resistance strain wire stretched in tension between and mounted upon said members, and an electrical connection at the ends of said strain wire.

3. A motion sensing device which comprises a frame, a flexible diaphragm, a flexure member connected to said frame and to said diaphragm at an angle intermediate the ends thereof said diaphragm extending beyond said flexure member, said flexure member having an arcuate cross section and intersecting said diaphragm along spaced arcs intermediate the ends of said diaphragm, said diaphragm bending along lines of flexure radially of said arcs on application of a force against said diaphragm, means for applying a force to said diaphragm between said arcs, wire mountings connected to the outer ends of said diaphragm beyond said flexure member, an unbonded electrical resistance strain wire stretched in tension between and mounted upon said wire mountings, and an electrical connection at the ends of said strain wire.

4. A motion sensing device which comprises a flexible diaphragm, a circular flexible supporting means for supporting said diaphragm, said diaphragm extending beyond said flexible supporting means, means for applying a force to said diaphragm to cause deflection of said diaphragm on one side of said flexible supporting means in a direction opposite to deflection of said diaphragm on the other side of said flexible supporting means, and means for sensing the deflection of said diaphragm, said last named means comprising pins mounted on said diaphragm beyond said flexible supporting means and an unbonded electrical resistance strain wire stretched in tension between and mounted on said pins.

5. A motion sensing device which comprises a diaphragm a circumambient flexure member connected to said diaphragm and intersecting said diaphragm, said diaphragm extending beyond said circumambient flexure member, said diaphragm bending along lines of flexure on both sides of said flexure member upon application of a force against said diaphragm, means for applying a force to said diaphragm, the deflection of said diaphragm on one side of said flexure member being in a direction opposite to the deflection of the diaphragm on the other side of said flexure member, an unbonded electrical resistance strain wire mechanically connected to said diaphragm, and an electrical connection at the ends of said strain wire.

6. In the device of claim 5, including pins mounted on said diaphragm beyond said flexure member, said unbonded electrical resistance strain wire being stretched in tension between and mounted on said pins.

7. A pressure responsive device which comprises a frame, a housing mounted in said frame, said housing having an internal pressure chamber therein, an inlet in said frame to said chamber, a diaphragm supported on said housing at one end of said chamber spaced from said inlet, a circumambient wall of said housing being connected to said diaphragm, said diaphragm extending beyond said wall, said wall being flexible along a circumambient area of flexure on variation in pressure in said chamber against said diaphragm, said diaphragm within said wall deflecting in a direction opposite to the direction of deflection of the outer end of said diaphragm beyond said wall, and insulated pins mounted on said diaphragm beyond said wall and unbonded electrical resistance strain wire stretched in tension between and mounted on said pins.

8. In the device of claim 7, said insulated pins being mounted directly on and extending from said diaphragm beyond said flexible area of said wall.

9. In the device of claim 7, said pins being mounted on said diaphragm beyond said wall at spaced points on both sides of said diaphragm and said electrical resistance strain wire extending in tension between said pins on both sides of said diaphragm.

10. In the device of claim 7, said circumambient area of flexure comprising a circumambient groove in said wall.

11. In the device of claim 7, said circumambient area of flexure comprising a circumambient groove in said wall and said insulating pins being mounted directly on and extending from said diaphragm beyond said wall.

12. In the device of claim 11, said pins extending from both sides of said diaphragm and said strain wire extending in tension on both sides of said diaphragm between said pins.

13. A pressure responsive device which comprises a housing, said housing having an internal pressure chamber therein, an inlet in said frame to said chamber, a diaphragm supported on said housing at one end of said chamber spaced from said inlet, a circumambient wall of said housing being connected to said diaphragm, said diaphragm extending beyond said wall, said wall being flexible along a circumambient area of flexure on variation in pressure in said chamber against said diaphragm, said diaphragm within said wall deflecting between said wall in a direction opposite to the direction of deflection of the outer end of said diaphragm beyond said wall, an unbonded electrical resistance strain wire mechanically connected to said diaphragm, and an electrical connection at the ends of said strain wire.

14. In the device of claim 7, said circumambient wall being integrally connected to said diaphragm and said circumambient area of flexure being a localized area of said wall of reduced cross section adjacent said diaphragm.

15. In the device of claim 14, said insulated pins mounted on said diaphragm beyond said flexible area of said wall.

16. In the device of claim 14, said pins being mounted on said diaphragm beyond said wall at spaced points on both sides of said diaphragm and said electrical resistance strain wire extending in tension between said pins on both sides of said diaphragm.

17. In the device of claim 14, said diaphragm being integrally connected at one side only to said wall.

18. In the device of claim 17, said insulated pins mounted on said diaphragm beyond said flexible area of said wall.

19. In the device of claim 18, said pins being mounted on said diaphragm beyond said wall at spaced points on both sides of said diaphragm and said electrical resistance strain wire extending in tension between said pins on both sides of said diaphragm.

20. In the device of claim 19, said pins extending from both sides of said diaphragm and said strain wire extending in tension on both sides of said diaphragm between said pins.

21. A differential motion sensing device which comprises a frame, a flexible diaphragm, a flexure member connected to said frame and to said diaphragm at an angle intermediate the ends thereof, said diaphragm extending beyond said flexure member, said flexure member having an arcuate cross section and intersecting said diaphragm along spaced arcs intermediate the ends of said diaphragm, said diaphragm bending along lines of flexure radially of said arcs on application of a force against said diaphragm, means for applying a first force to one side of said diaphragm, means for applying a second force to the opposite side of said diaphragm in opposition to said first force, an unbonded electrical resistance strain wire mechanically connected to said diaphragm, and an electrical connection at the ends of said strain wire.

22. A differential motion sensing device which comprises a frame, a flexible diaphragm, a flexure member connected to said frame and to said diaphragm at an angle intermediate the ends thereof, said flexible diaphragm extending beyond said flexure member, said flexure member having an arcuate cross section and intersecting said diaphragm along a pair of spaced arcs intermediate the ends of said diaphragm, said diaphragm bending along lines of flexure radially of said arcs on application of a force against said diaphragm, means for applying a first force to one side of said diaphragm between said arcs, means for applying a second force to the opposite side of said diaphragm between said arcs in opposition to said first force, said diaphragm deflecting upon said flexure member at points between said spaced arcs in response to the resulting differential force and in a direction opposite to the direction of deflection of said diaphragm at the outer ends thereof beyond said flexure member, spaced apart pins mounted on said diaphragm beyond said flexible member, an unbonded electrical resistance strain wire stretched in tension between and mounted upon said pins, and an electrical connection at the ends of said strain wire.

23. A differential pressure responsive device which comprises a housing, said housing having a pair of internal pressure chambers therein, an inlet in said housing to each of said chambers, a diaphragm supported on said housing and separating said chambers, the adjacent circumambient walls of said chambers being connected to said diaphragm, said diaphragm extending beyond said walls, said walls each being flexible along a circumambient area of flexure on variation of pressure in said chambers against said diaphragm, said diaphragm within said walls deflecting between said walls in response to the differential pressures of the pressure fluids in said chambers in a direction opposite to the direction of deflection of the outer end of said diaphragm beyond said walls, an unbonded electrical resistance strain wire mechanically connected to said diaphragm, and an electrical connection at the ends of said strain wire.

24. In the device of claim 23, said walls and said diaphragm being integrally connected.

25. In the device of claim 24, said circumambient area of flexure constituting a localized section of said wall of reduced cross section adjacent said diaphragm.

26. A differential pressure responsive device, which comprises: a frame, a housing mounted in said frame, said housing having a pair of internal pressure chambers therein, an inlet in said frame to each of said chambers, a diaphragm supported on said housing and separating said chambers, the adjacent circumambient walls of said housing being connected to said diaphragm, said diaphragm extending beyond said walls, said walls being flexible and adapted to flex on the application of pressure fluid in said chambers against said diaphragm, spaced apart members mounted on the periphery of said diaphragm, said diaphragm within said walls bending on application of pressure against said diaphragm, said diaphragm between said walls deflecting in response to the differential pressure of the pressure fluids in said chambers in a direction opposite to the direction of deflection of the outer end of said diaphragm beyond said walls, an unbonded electrical resistance strain wire stretched in tension between and mounted upon said members, and an electrical connection at the ends of said strain wire.

References Cited in the file of this patent
UNITED STATES PATENTS

| | | |
|---|---|---|
| 2,442,938 | Ruge | June 8, 1948 |
| 2,721,919 | Li et al. | Oct. 25, 1955 |